(No Model.)

I. L. ROBERTS.
ELECTRIC BATTERY.

No. 308,992. Patented Dec. 9, 1884.

Witnesses:
Joseph L. Levy
Anton J. Lehman

Inventor:
Isaiah L. Roberts
by his atty
Henry L. Brevoort

UNITED STATES PATENT OFFICE.

ISAIAH L. ROBERTS, OF BROOKLYN, NEW YORK, ASSIGNOR OF ONE-HALF TO HENRY L. BREVOORT, OF SAME PLACE.

ELECTRIC BATTERY.

SPECIFICATION forming part of Letters Patent No. 308,992, dated December 9, 1884.

Application filed June 17, 1884. (No model.)

*To all whom it may concern:*

Be it known that I, ISAIAH L. ROBERTS, a citizen of the United States, and a resident of the city of Brooklyn, county of Kings, and State of New York, have made a new and useful invention in Electric Batteries, of which the following is a specification, and which, when taken in connection with the accompanying drawings, will enable others skilled in the art to practice my invention.

My invention relates to a primary battery for the production of electric currents; and it consists of a battery made in the following manner.

Figure 1:
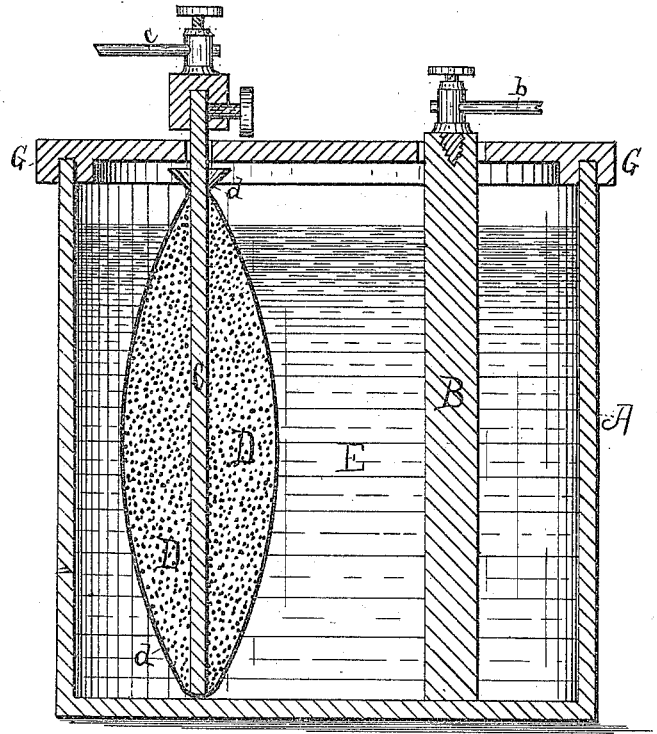
Figure 2:
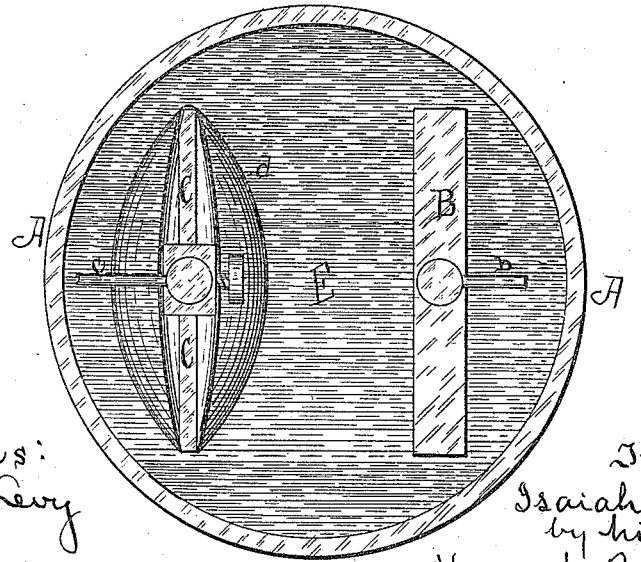

Referring to the accompanying drawings, Figure 1 shows a vertical cross-section, and Fig. 2 a top view with the cover removed.

A is a cell, made of glass or some material which is not affected injuriously by the contents of the cell.

B is a plate of zinc, having a screw-cup and conductor, $b$, attached thereto.

C is a plate, spiral or other shaped conductor, preferably made of copper, though any metallic conductor other than zinc can be used. Carbon also can be used, but is more expensive than thin copper or the like. $c$ is the conductor attached to this plate of metal or carbon. Surrounding the conductor C is a mass of copper peroxide, commonly known as "black copper oxide." This can be obtained in the form of copper scale. This material is held to the plate C by a bag, $d$, or a porous cup. A bag of textile material fine enough to keep the black oxide of copper in place is the best.

At E is shown the solution used in the cell. This solution consists of water having added thereto zinc dissolved in muriatic acid—in other words, chloride of zinc. I find it best to use about ten per cent., by weight, of the ordinary crystals of chloride of zinc to ninety per cent. of water; but this proportion may be varied very considerably in either direction. An excess of chloride of zinc in the solution increases the resistance of the battery, as well as injuriously affecting the copper oxide.

This battery will be found to be comparatively cheap, and it possesses the capacity of recuperation after it has been run down by being used too long on a closed-circuit of little resistance. It will be found that after considerable use the zinc will fall to the bottom of the cell in apparently a metallic powder. A portion of the copper oxide will be reduced to metallic copper. When all the zinc is destroyed, a new zinc plate can be added, and the battery will be equally effective practically without a change in the solution or the copper peroxide, the solution in my battery not being affected by the use of the apparatus. The same copper peroxide can be used for very great lengths of time, and is capable of destroying many zinc elements.

I have shown in the drawings, at G, Fig. 1, the method of supporting the elements in the cell, which consists of a properly-slotted wooden cover. Though the elements are shown in the drawings as resting on the bottom of the cell, the preferable arrangement is to have them held in suspension, so that a space is left between them and the bottom of the cell.

What I claim, and desire to secure by Letters Patent, is—

1. An electric battery in which a mass of copper peroxide is secured to and in contact with a conductor and a surrounding solution within a containing-cell, consisting of chloride of zinc and water, and an element of zinc, substantially as described.

2. An electric battery in which a mass of copper peroxide is secured to and in contact with a metallic conductor and a surrounding solution, within a containing-cell, consisting of chloride of zinc and water, and an element of zinc, substantially as described.

3. An electric battery in which a mass of copper peroxide is secured to and in contact with a conductor by a porous envelope, a solution consisting of chloride of zinc and water, and an element of zinc, all contained within a cell, substantially as described.

4. An electric battery in which a mass of copper peroxide is secured to and in contact with a conductor of copper by an envelope of textile material, a solution of chloride of zinc in water, and an element of zinc, all contained within an appropriate cell, substantially as described.

ISAIAH L. ROBERTS.

Witnesses:
JOSEPH L. LEVY,
A. J. LEHMAN.